(12) United States Patent
O'Riordan et al.

(10) Patent No.: US 8,176,463 B2
(45) Date of Patent: May 8, 2012

(54) MODELING AND SIMULATING DEVICE MISMATCH FOR DESIGNING INTEGRATED CIRCUITS

(75) Inventors: Donald J. O'Riordan, Sunnyvale, CA (US); Arthur Schaldenbrand, Yokohama (JP); John O'Donovan, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 238 days.

(21) Appl. No.: 12/561,801

(22) Filed: Sep. 17, 2009

(65) Prior Publication Data

US 2011/0066997 A1    Mar. 17, 2011

(51) Int. Cl.
*G06F 17/50* (2006.01)
(52) U.S. Cl. ............ 716/136; 716/126; 716/139; 703/14
(58) Field of Classification Search .................. 716/126, 716/136, 139; 703/14
See application file for complete search history.

(56) References Cited

U.S. PATENT DOCUMENTS 7,418,683 B1 * 8/2008 Sonnard et al. ............... 716/122

OTHER PUBLICATIONS

European Application Serial No. 10176648.3, Response filed Oct. 6, 2011 to Office Action mailed Feb. 25, 2011, 17 pgs.
European Application Serial No. 10176648.3, Extended European Search Report mailed Feb. 25, 2011, 7 pgs.
Bastos, J, et al., "Matching of MOS Transistors with Different Layout Styles", Proceedings of the 1996 IEEE International Conference on Microelectronic Test Structures, vol. 9, (Mar. 1996), 17-18.
Okada, K, et al., "Layout Dependent Matching Analysis of CMOS Circuits", Analog Integrated Circuits and Signal Processing, 25, (2000), 309-318.
O'Riordan, D, "Recommended Spectre Monte Carlo Modeling Methodology", [online] The Designers Guide Community, www.designers-guide.org, (2006), 12 pgs.

* cited by examiner

*Primary Examiner* — Thuan Do
(74) *Attorney, Agent, or Firm* — Schwegman, Lundberg & Woessner, P.A.

(57) ABSTRACT

A user specifies layout styles for devices in a circuit schematic, where the layout styles capture features of device arrangements and device correlations. The resulting layout can be simulated by using a computer so that one or more performance metrics can be evaluated for the circuit. In some cases, test chips may be used to determine device correlations for arrangements corresponding to different layout styles.

26 Claims, 22 Drawing Sheets

```
//-----------------------------------------------------------------
// Process section
// Define resistor process parameters, including mismatch effects
parameters RSHSP=200 // sheet resistance
+ SPDW=0 // etching variation from ideal
+ XRSP=1 // device mismatch parameter
+ XRSPafac=100m // RS mismatch parameter
+ XRSPbfac=1m // RS mismatch parameter
+ RSHSPnom=200 // sheet resistance nominal value
// A resistor subckt model that includes geometrical and process effects inline subckt RPLR (A B)
parameters Rnom=1 // input, nominal resistance value
+ WB=10u // input, resistor width
+ LB=Rnom?WB/RSHSPnom // length = R?W/RSH
+ AB=LB? (WB+SPDW) // effective area, with etching effect
RPLR (A B) resistor r=RSHSP?LB/(WB+SPDW) ?(1+(XRSPafac/sqrt(AB)+XRSPbfac)
?(XRSP−1))
ends RPLR // A statistics block that specifies process variations
statistics {
        process {
                vary RSHSP dist=gauss std=5 // apply variations in sheet resistance
                vary SPDW dist=gauss std=0.25 // apply variations in etching
        }
        mismatch {
                vary XRSP dist=gauss std=1 // apply resistor mismatch
        }
}
//-----------------------------------------------------------------
```

FIG. 3

```
//-----------------------------------------------------------------
// match pairs, specify correlation coefficients
statistics {
correlate dev=[R1 R2] cc=0.75 // correlate the resistors
}
//-----------------------------------------------------------------
```

FIG. 4

```
//------------------------------------------------------------------------
statistics {
    correlate dev=[m1 m2] param=[xisn xisp] cc=0.2
}
//------------------------------------------------------------------------
```

| Constraint (1) | All Parameters |
|---|---|
| Name | Constr_0 |
| Owner | ether_adcflash_RAD90... |
| Enabled | true |
| Status | none |
| Notes | |
| Coefficient | 0.2 |
| correlatedP... | xisn, xisp |

| Mmenomic | Details |
|---|---|
| "Unmatched" | Non interdigitated, possibly different orientation, spaced far apart |
| "Weakly Matched" | Non-interdigitated, same orientation, spatial proximity |
| "Simply Matched" | Interdigitated |
| "Moderately Matched" | Interdigited, with end row dummies |
| "Well Matched" | Cross Quad layout |
| "Very Well Matched" | Symmetrical Cross Quad layout |
| "Extremely well matched" | Symmetrical Cross Quad layout, with fully dummy surround |

Mnemonic Table for Matching Styles

FIG. 13

Schematic Resistor Pair

Resistor pair of identical aspect rectangles

Resistor pair as simple rectangles with same aspect ratio, same area.

Resistor layout with same aspect ratio, same area, same orientation

Resistor layout with same aspect ratio, same area, same orientation, spatial proximity
FIG. 18
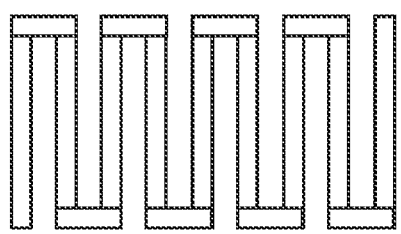 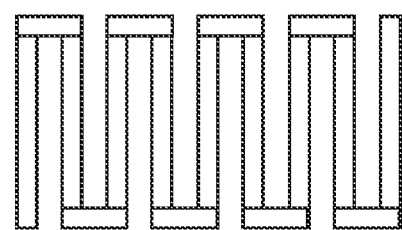
Serpentined resistor layout
FIG. 19

Etching (Edge) effects in a resistor layout

Series connected resistors

Long single serpent resistor layout

Sub-serpents A1-A4

Dashed outlines showing Bounding Boxes

Bounding Box Layout for two resistors A, B

Simple Interdigitation scheme for resistors A, B

| A1 | B4 | A2 | B3 | A3 | B2 | A4 | B1 |

Advanced resistor interdigitation scheme

FIG. 27

| D | A1 | B4 | A2 | B3 | A3 | B2 | A4 | B1 | D |

Linear layout with row-end-dummy-devices (D)

FIG. 28

| A1 | B4 | A3 | B2 |
|----|----|----|----|
| B3 | A2 | B1 | A4 |

Simple cross quad layout of resistors A, B

FIG. 29

| A1 | B4 | B1 | A4 |
|----|----|----|----|
| B3 | A2 | A3 | B2 |

Symmetrical Cross Quad Layout of resistors A, B

FIG. 30

| D | D | D | D | D | D |
|---|---|---|---|---|---|
| D | A1 | B4 | B1 | A4 | D |
| D | B3 | A2 | A3 | B2 | D |
| D | D | D | D | D | D |

Symmetrical Cross Quad layout with full dummy surround

FIG. 31

| Mnemonic | Details | Figure |
|---|---|---|
| "Unmatched" | Non interdigitated, possibly different orientation, spaced far apart | N/A |
| "Weakly Matched" | Non-interdigitated, same orientation, spatial proximity | Figure 19 |
| "Simply Matched" | Interdigitated | Figure 27 |
| "Moderately Matched" | Interdigited, with end row dummies | Figure 28 |
| "Well Matched" | Cross Quad layout | Figure 29 |
| "Very Well Matched" | Symmetrical Cross Quad layout | Figure 30 |
| "Extremely well matched" | Symmetrical Cross Quad layout, with fully dummy surround | Figure 31 |

Mnemonic Table for Matching Styles

FIG. 32

Pair of poorly matched MOS transistors

Pair of well matched (and routed) MOS transistors

```
//----------------------------------------------------------------------------------

// statistics block written by modeling/process expert
statistics {
  process {
    vary params = [p1 p2 p3] dist=gauss std=55.33
    vary params = [p4 p5 ...p99] dist=gauss std=...
  }
  mismatch {
    vary params = [p1 p2 p3] dist=gauss std=6.7
    vary params = [p4 p5 ...p99] dist= std =
  } correlate_group {
    master=npn1 {
        matching = "interdigitated" icon="interdigitated.png"{
           params = [p1 p2 p3] cc=0.98
           params = [p4 p5 p6] cc=0.97
        }
        matching="strong" icon="strong.png" {
          params = [p1 p2 p3] cc=0.95
          params = [p4 p5 p6] cc=0.93
        }
        matching="weak" icon="weak.png"{
          params = [p1 p2 p3] cc=0.87
          params = [p4 p5 p6] cc=0.81
        }
      master=pnp99 {
        matching = "interdigitated" icon="interdigitated.png"{
           params = [p1 p2 p3] cc=0.87
           params = [p4 p5 p6] cc=0.45
        }
        matching="strong" icon="strong.png"{
          params = [p1 p2 p3] cc=0.77
          params = [p4 p5 p6] cc=0.32
        }
        matching="weak" icon="weak.png"{
          params = [p1 p2 p3] cc=0.65
          params = [p4 p5 p6] cc=0.21
        }
    } // end correlate_group
} // end statistics written by process modeling expert //----------------------------------------------------------------------------------
```

FIG. 35

| | |
|---|---|
| Constraint (1) ▼ | All Parameters ▼ |
| Name | Constr_0 |
| Owner | ether_adcflash_RAD90 |
| Enabled | true |
| Status | none |
| Notes | |
| LayoutStyle | interdigitated ▼ |

...
q1 (a b c) npn1 area=...
q2 (b c d) npn1 area=...

q3 (p q r) pnp99 area=
q4 (x y z) pnp99 area=...

q88 (a b c) npn1 area=...
q99 (b c d) npn1 area=...

q77 (p q r) npn2 area=
q66 (x y z) npn2 area=...

m1 (d g s) nmos1 area=...
m2 (d g gnd) nmos1 area=...

statistics {

// devices whose matching properties are enumerated
   correlate dev=[q1 q2] matching="interdigitated"
   correlate dev=[q3 q4] matching="strong"
   correlate dev=[q5 q6] matching="weak"

// devices whose matching properties are numerical
   correlate dev=[q88 q99] params=[p1 p2 p3] cc=0.95
   correlate dev=[q88 q99] params=[p3 p4 p5] cc=0.92
   correlate dev=[q77 q66] params=[...] cc=..
   correlate dev=[q77 q66] params=[...] cc=..

Correlate_Group {
    matching = "interdigitated{
        master = npn1 {
            Params = [p1 p2 p3] cc=0.98
            Params = [p4 p5 p6] cc=0.97
        }
        master=pnp99 {
            Params = [p1 p2 p3] cc=0.87
            Params = [p4 p5 p6] cc=0.45
        }
    } // end of "interdigitated"

Matching="strong" {
        master = npn1{
            Params = [p1 p2 p3] cc=0.88
            Params = [p4 p5 p6] cc=0.86
        } master=pnp99 {
            Params = [p1 p2 p3] cc=0.75
            Params = [p4 p5 p6] cc=0.38
        }

} // end of "strong"
} // end of correlate group

MODELING AND SIMULATING DEVICE MISMATCH FOR DESIGNING INTEGRATED CIRCUITS

BACKGROUND OF THE INVENTION

1. Field of Invention

The present invention relates to integrated circuits and more particularly to the effect of device mismatch in integrated circuit design.

2. Description of Related Art

In the design of integrated circuits, manufacturing variations are typically modeled in two forms, including global process parameter variations, which affect all die or devices on a die equally, and mismatch variation, where two individual devices placed on a die, even in very close proximity to each other, continue to exhibit some degree of localized variations. With the development of increasingly compact designs, shrinking process geometries have lead to increased relative variations in process and device parameters, which affect parametric yield, particularly for analog designs but also for sensitive digital designs. As a result, designers have used statistical analysis tools to assess performance degradation related to parametric variations in circuit designs, particularly variations related to device mismatch. See, for example, "The Recommended Spectre® Monte Carlo Modeling Methodology," by Don O'Riordan, Cadence Design Systems, version 1, Dec. 12, 2003, (downloaded from designers-guide.org) which is incorporated herein by reference in its entirety.

For example, circuit designers typically perform a variety of sensitivity and Monte Carlo analyses to determine which particular pairs or tuples of transistors in the design are the most sensitive to these mismatch effects, and transistors identified in this way are subject to special consideration during layout so that they exhibit the necessary degree of matching. Devices laid out using techniques that depend on a larger area tend to exhibit lesser mismatch than smaller area devices, but at the obvious expense of increased area. The general desire is of course to minimize area and to use transistors that are as small (or as weakly matched) as possible while still maintaining a sufficient degree of matching to ensure an acceptable parametric yield. See, for example, "Matching properties of MOS transistors," by M. J. M. Pelgrom, A. C. J. Duinmaijer, and A. P. G. Welbers, *IEEE J. Solid State Circuits*, vol. 24, pp. 1433-1440, 1989, which is incorporated herein by reference in its entirety.

In order to reduce device mismatch, a variety of layout matching strategies have been developed for mismatch-sensitive transistors, strategies which vary from simply placing the transistors in close proximity, to also ensuring they have the same orientation, to further inter-digitating them, to splitting them up into a cross-quad configuration, or using other module generation patterns, to further surrounding these patterns with dummy devices. For example, FIG. 1 shows a pair of devices A, B that share a single source node (1) but have different gates and drain nodes (2,3). FIG. 2 shows two alternative layout schemes 202, 204 for inter-digitating these transistors to ensure a good level of matching, and while similar, they will also have subtle differences which need to be modeled in today's high-variability processes. It is of course difficult to know exactly which layout strategy to select for any individual devices without first performing the appropriate analysis (such as mismatch sensitivity or Monte Carlo analysis), where the analysis factors those layout strategies into the simulation.

However, although a variety of transistor and other device layout techniques have been developed reduce mismatch variation, the methods employed to select a given layout technique are generally more qualitative than quantitative, and the estimated effect on circuit performance is not generally available to the designer even when statistical analysis tools are available. For example, in conventional simulation tools, the designer may have limited choices for modeling mismatch variations for a device type with one default correlation coefficient for matched devices and one default correlation coefficient for unmatched devices as an alternative to providing his own correlation coefficient. Due to lack of modeling accuracy, designers typically tend to over-specify matching constraints in order to ensure a sufficient degree of parametric yield, because they are not in a good position to accurately simulate (from a statistical device parameter mismatching sense) the corresponding layout structures using a circuit simulator. Such over specifications lead to over engineering, over lengthy layout cycles, and larger chip area than actually necessary.

Thus, there is a need for improved analysis of device mismatch for designing integrated circuits.

SUMMARY OF THE INVENTION

Certain embodiments of the present invention enable a user to specify layout styles for devices in a circuit schematic, where the layout styles capture features of device arrangements and device correlations. The resulting layout can be simulated by using a computer so that one or more performance metrics can be evaluated for the circuit. In some cases, test chips may be used to determine device correlations for arrangements corresponding to different layout styles.

One embodiment provides a method of designing a circuit. Layout styles are specified for devices, where each layout style includes values for specifying an arrangement of devices and correlations between device models that include simulation parameters for simulating devices. A schematic is specified for the circuit, where the schematic includes devices, connections between devices, and electrical parameters that specify electrical properties of the devices. A layout is determined for the circuit by using a computer to select layout styles for one or more devices in the circuit schematic, where the layout includes size parameters that specify sizes for the devices. One or more performance metrics are evaluated for the layout by using the computer to simulate circuit performance with device models that are correlated according to the specified layout styles.

Additional embodiments relate to an apparatus for carrying out the above-described method, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out the above-described method with a computer. In these ways the present invention improved analysis of device mismatch for designing integrated circuits.

BRIEF DESCRIPTION OF THE DRAWINGS

FIG. 3 shows an exemplary software listing for a device simulation model.

FIG. 4 shows an exemplary software listing for correlating model parameters.

FIG. 13 shows an exemplary table that relates mnemonics to layout styles for an embodiment of the present invention.

FIGS. 15, 16, 17 & 18 show exemplary layouts related to the example in FIG. 14.

FIG. 19 shows an exemplary pair of series-connected resistors for an embodiment of the present invention.

FIGS. 25, 26, 27, 28, 29, 30 & 31 show bounding box layouts related to the example in FIG. 22.

FIG. 32 shows an expanded version of FIG. 13 that includes geometric characteristics and constraints associated with the different layout styles for an embodiment of the present invention.

FIG. 35 shows an exemplary software listing that includes data structures for correlating model parameters for an embodiment of the present invention.

FIG. 36 shows a GUI menu related to the example in FIG. 35.

FIG. 37 shows another exemplary software listing that includes data structures for correlating model parameters for an embodiment of the present invention.

FIG. 38 shows another exemplary software listing that includes data structures for correlating model parameters for an embodiment of the present invention.

DETAILED DESCRIPTION OF EXEMPLARY EMBODIMENTS

Figure 1:
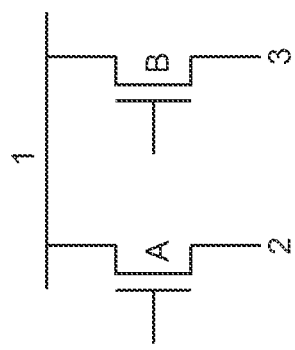
FIG. 1 shows an exemplary pair of transistors.
Figure 2:
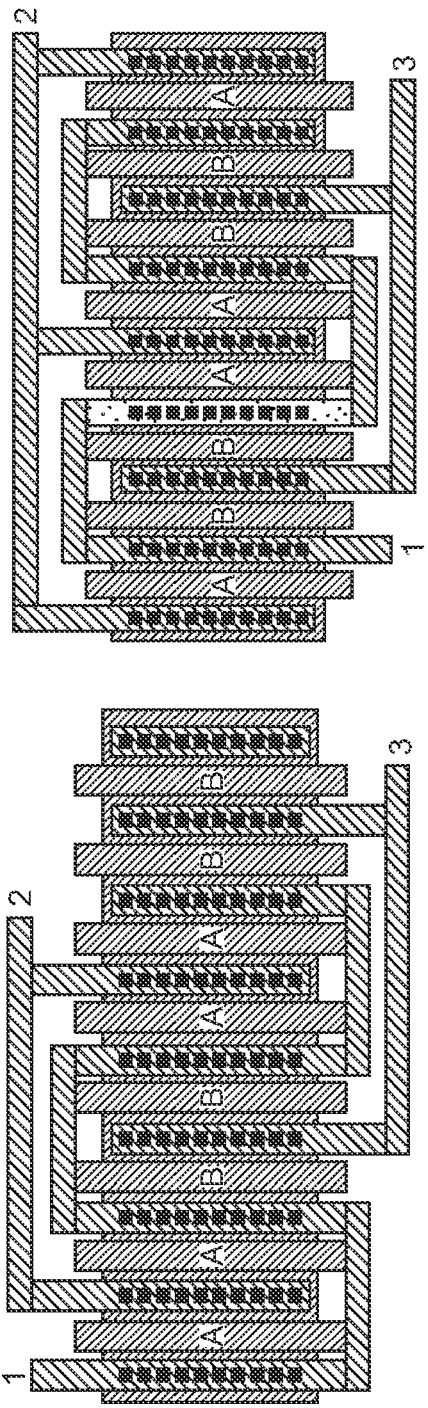
FIG. 2 shows two exemplary layouts for the transistors in FIG. 1.

Embodiments of the present invention can be directed towards a variety of device models that include statistical characterizations of mismatch variations. For example, software tools have been developed so that test engineers can model matched devices and provide corresponding correlation-coefficient values to an IC (Integrated Circuit) design engineer. ("The Recommended Spectre® Monte Carlo Modeling Methodology," by Don O'Riordon, Cadence Design Systems, version 1, Dec. 12, 2003, downloaded from designers-guide.org.) According to the conventional approach, a test engineer can then create test chips that contain two types of devices (matched and unmatched), and then characterize (e.g., measure) both of them for mismatch, the results of which are then used to extract Pelgrom coefficients such as Afactor and Bfactor (also known as AFAC and BFAC) from multiple device samples on the test chip. ("Matching properties of MOS transistors," by M. J. M. Pelgrom, A. C. J. Duinmaijer, and A. P. G. Welbers, *IEEE J. Solid State Circuits*, vol. 24, pp. 1433-1440, 1989.)

Models such as the inline sub-circuit RPLR (e.g., a diffusion resistor sub-circuit model that includes geometrical and process effects) for a diffusion resistor are then produced in conventional syntax, which is included in a PDK (Process Design Kit) with the Pelgrom equations incorporated via statements such as $$r = RSHSP*LB/(WB+SPDW)*(1+(XRSPafac/sqrt(AB) + XRSPbfac)*(XRSP-1))). \tag{1}$$

The statement above indicates that resistance mismatch is proportional to $1/sqrt(AB)$ where AB is the effective device area, and the variance in the mismatch value itself is scaled via the XRSP parameter. FIG. 3 shows a corresponding conventional syntax listing for the diffusion resistor sub-circuit model "RPLR" including a process section that defines process parameters (e.g., mismatch effects), the implementation of the resistance formula given by equation (1), and a statistics block that specifies process/mismatch variations. The final statement of the statistics block defines the mismatch variation and indicates that the RS parameter will be varied with a Gaussian distribution with a unit standard deviation about its nominal value of 1. For a given device type, test structure engineers can use this methodology to code up analogous sub-circuit models and statistics blocks for incorporation into a corresponding Process Design Kit (PDK) for applications in Electronic Design Automation (EDA). In general, a PDK is a set of files that enable analog and mixed-signal IC circuit design within a customized design environment. PDKs are generally available in a prepackaged format for various foundries and manufacturers. Typical details that are captured within the PDKs include SPICE (Simulation Program with Integrated Circuit Emphasis) models, component descriptions, specific design rules and their values, etc.

The interface presented to the circuit designer (e.g., the user of the PDK) is then simply one of selecting which particular devices are to be matched, and specifying an appropriate correlation coefficient. In conventional syntax, the designer employs a correlation statement such as illustrated in FIG. 4, where a correlation coefficient cc=0.75. Typically, this value can be presented to the circuit designer through a user interface with an option to override the value although the user may not have additional information to support such an override. Typically, the correlation coefficient can be applied to all statistically varying simulation parameters in the model (e.g., RSHSP, SPDW, and XRSP in FIG. 3). In some cases, however, correlation coefficients may be applicable to specific model parameters as illustrated in FIG. 5, where a correlation coefficient cc=0.2 is defined for twoparameters (xisn, xisp) of two transistor devices (m1, m2).

Figures 5, 6, 7:
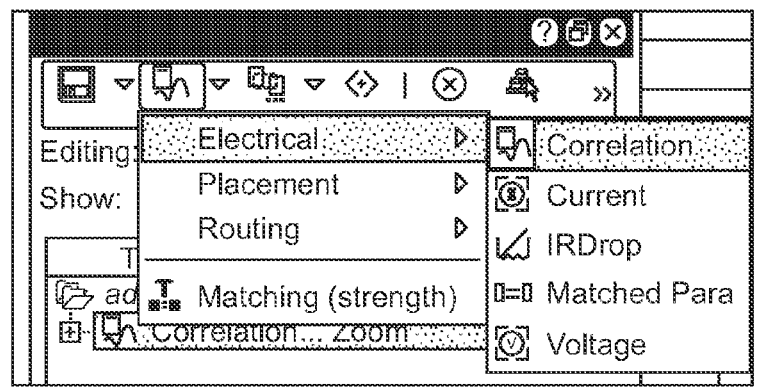
FIG. 5 shows another exemplary software listing for correlating model parameters.
FIGS. 6 & 7 show exemplary GUI (Graphical User Interface) menus related to the example in FIG. 5.

FIGS. 6 and 7 show how this last example is presented to the designer, where FIG. 6 shows a menu selection for the correlation of electrical parameters and FIG. 7 shows the correlation coefficient (cc=0.2) for the two parameters (xisn, xisp).

The above methodology is fairly flexible, in that it allows control over the correlation coefficients and individual parameters for any given selected device. However, as discussed above, this approach, which was developed in a context where devices tended to be either completely unmatched, or completely matched, and where there were very few device variants that required specialized correlation coefficients, is less desirable in the context of smaller device geometries and more stringent performance requirements. These requirements have led to additional options for designers and a need to accurately quantify those options (e.g., through correlation coefficients) in the design process.

Figure 8:
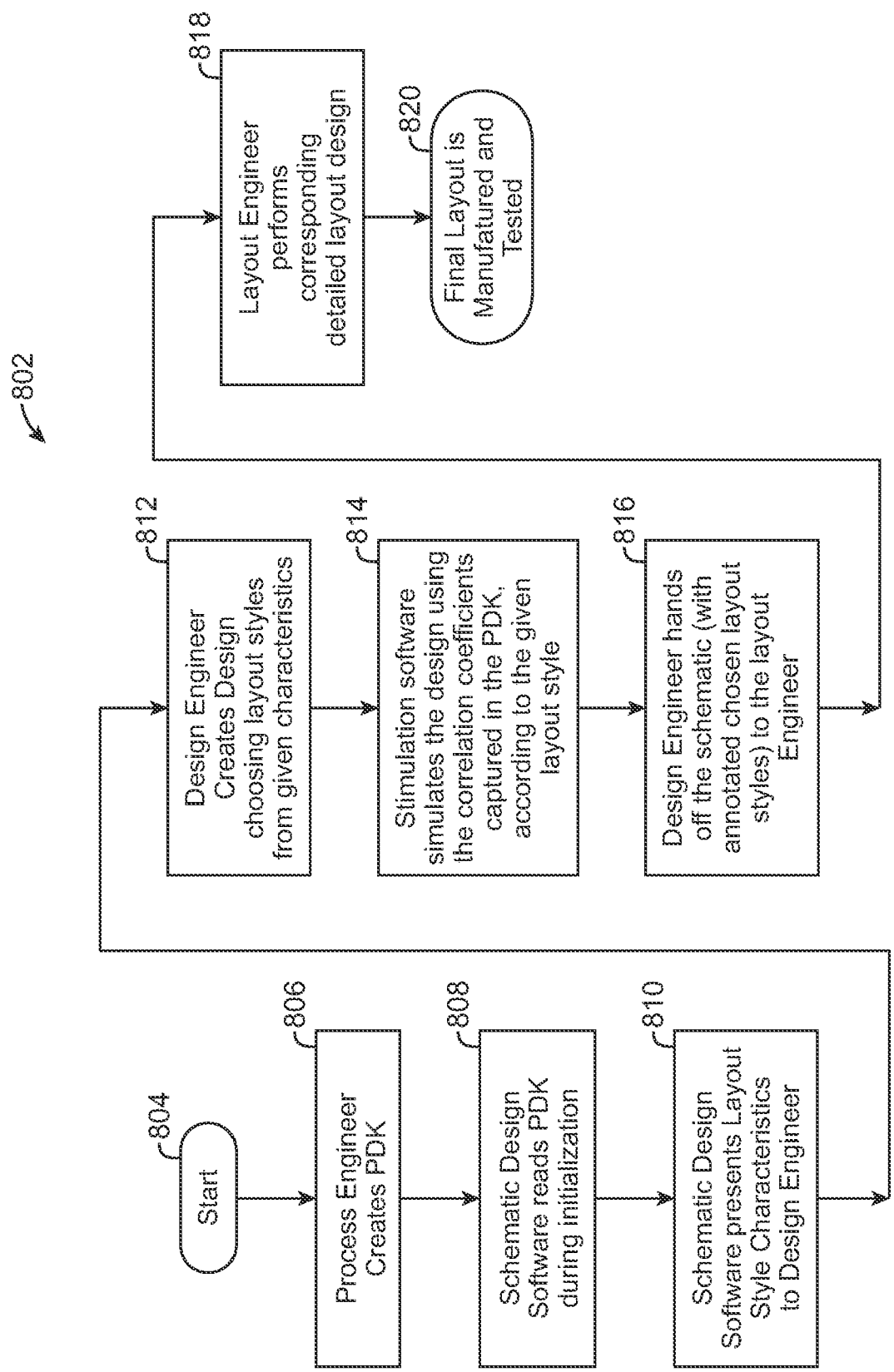
FIG. 8 shows a method of designing a circuit including operations by a process engineer, a design engineer and a layout engineer for an embodiment of the present invention.

FIG. 8 shows a method 802 of designing a circuit including operations by a process engineer, a design engineer and a layout engineer according to an embodiment of the present invention. At the start 804 of the method 802, a process engineer creates at least one Process Design Kit (PDK) that includes layout style characteristics (e.g., correlation coefficients, geometric constraints, mnemonics, icons) 806. Next schematic design software is used to read the PDK (or multiple PDKs) 808 and present corresponding layout style characteristics to a design engineer 810.

The design engineer (or circuit designer) creates a design by choosing layout styles based on the given characteristics 812 extracted from corresponding PDKs. Then simulation software is used to simulate the design using correlation coefficients extracted from the corresponding PDKs for the layout styles 814. Then the design engineer hands off the schematic (with annotated chosen layout style) to the layout engineer 816.

The layout engineer performs detailed layout design corresponding to the annotated schematic 818, and the resulting final layout is manufactured and tested 820. In general, the layout engineer is tasked with creating the layout information that maps the logical circuit design (the schematic created by the circuit designer) onto a physically manufacturable representation. The layout engineer creates the layout, using the appropriate layout style for the sensitive devices, as specified by the circuit designer with the schematic. In other words, the layout engineer implements the devices using the same layout style as was simulated by the circuit designer. After this, the final layout is manufactured and tested. In typical cases, this entire process 802 is performed in an iterative loop, with the design adjusted as needed according to test results until it is finally behaving correctly and with good yield. By making the circuit design process more accurate by statistically simulating the sensitive devices 814 with the correct variance reductions (e.g., correlation coefficients) that correspond to the actual layout styles used to implement those devices 812, the overall number of iterations required to produced a high yielding and functional design is desirably reduced.

Figure 9:
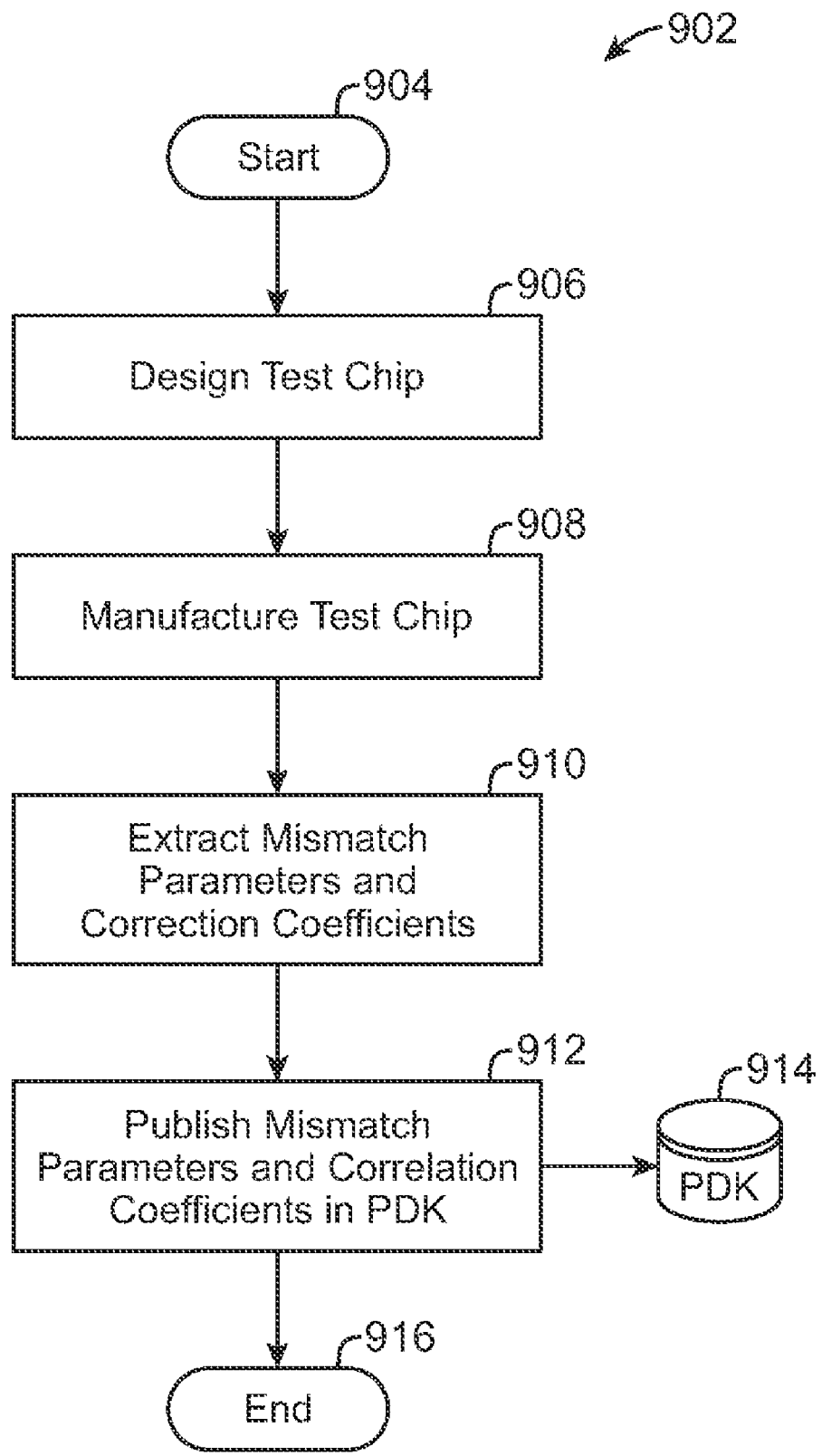
FIG. 9 shows a method 902 of creating a PDK (Process Design Kit) for a layout style for an embodiment of the present invention.

FIG. 9 shows further detail for the operations 806 of the process engineer as a method 902 of creating a PDK for a layout style. At the start 904 of the method 902, a test chip is designed 906. After the test chip is manufactured 908, mismatch parameters and correlation coefficients 910 can be extracted and then published 912 to a PDK 914 to end the process 916.

For a given layout style the process engineer creates a special test chip that is dedicated to the process of measuring and extracting device parameters, device mismatch parameters. Once the test chip is manufactured on the given process, it is characterized for device mismatch (among many other things) by the process engineer and the results captured in a Process Design Kit (PDK), along with other data, which is a database that is then supplied to circuit design engineers. The PDK contains (among other things), the statistical models used for simulating devices on the given manufacturing process.

Figure 10:
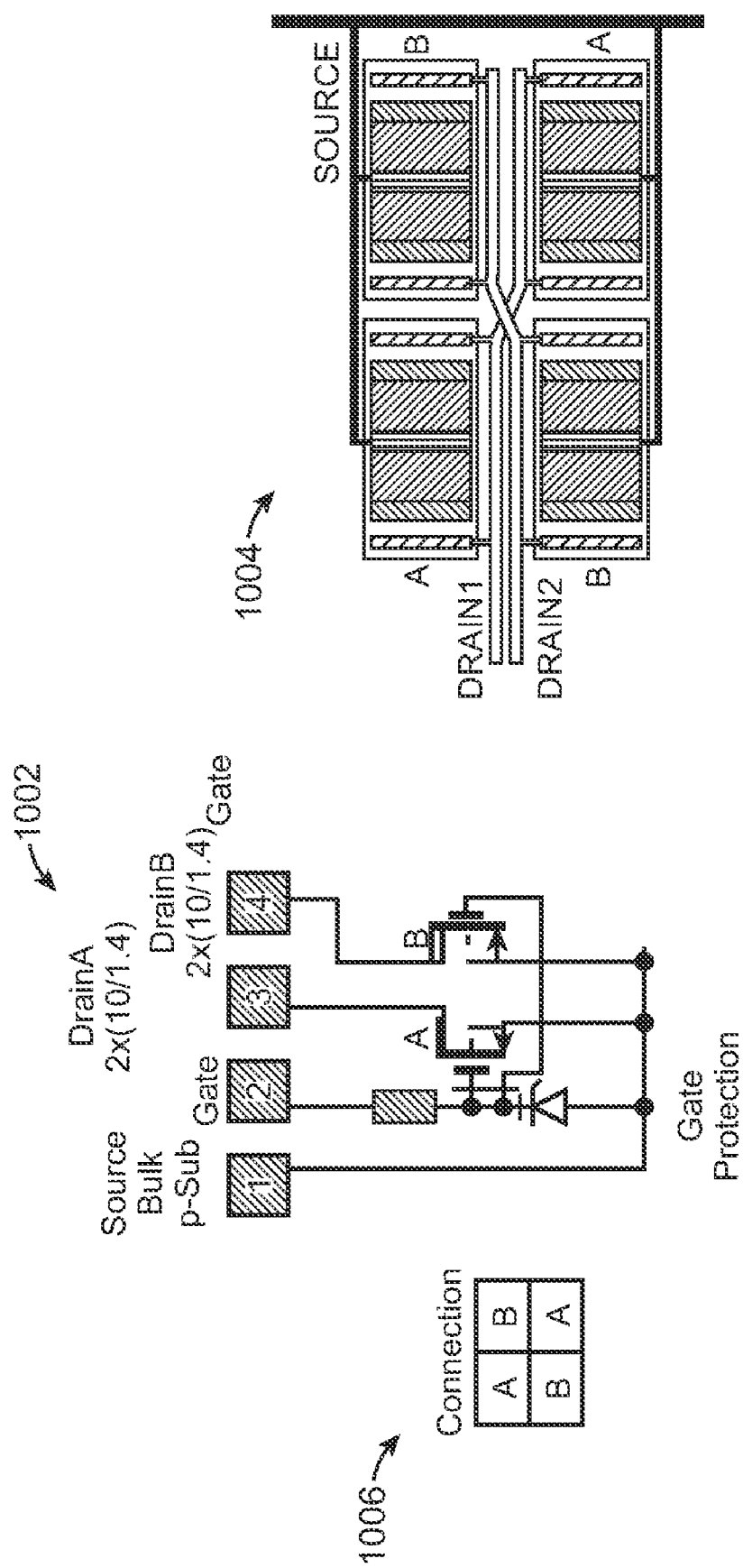
FIG. 10 shows an exemplary test structure for the embodiment shown in FIG. 9.

FIG. 10 shows an exemplary test structure 1002 (e.g., part of a test chip) for high-voltage transistors A and B illustrating Drain A, Drain B, Gate and Source. A cross-quad layout style 1004 is shown together with a corresponding graphical icon 1006. In a conventional design process, the process engineer creates a test chip containing many (e.g., 200) device pairs (e.g., the shown test structures 1002) with several different device dimensions (e.g. 9 different devices sizes), using the a single matching technique or layout style (e.g. the shown cross-quad layout style 1004).

Once the test chip is manufactured, measurements are performed on the devices in which voltages are applied and currents are measured using special equipment. From these current voltage measurements, the device matching parameters are extracted. By looking at the measurements over the many (e.g. 200) device pairs, an average value can be measured for each such parameter. For each individual device pair, its extracted parameter will differ slightly from the average value calculated across all the pairs, and a standard deviation of these differences can be calculated. Finally, the standard deviations are fitted against the geometries using the different device dimensions (e.g. the 9 different device sizes mentioned above).

Techniques for performing these measurements and extractions are known to those skilled in the art of process engineering/test chip design, and can be summarized as: (1) create the test chip with many samples of well matched devices, utilizing various device dimensions; (2) perform mismatch parameter extraction; (3) apply geometric scaling; and (4) encode results in simulation models in PDKs. See, for example, "Matching properties of MOS transistors," by M. J. M. Pelgrom, A. C. J. Duinmaijer, and A. P. G. Welbers, *IEEE J. Solid State Circuits*, vol. 24, pp. 1433-1440, 1989, and "Statistical Modelling of MOS Transistor Mismatch for High-voltage CMOS Processes" by W. Posch, H. Enichlmair, E. Schirgi and G. Rappitsch—*Qual. Reliab. Engng. Int.* 2005; 21:477-489 (DOI: 10.1002/qre.735), each of which is incorporated herein by reference in its entirety.

These steps can be repeated for a variety of layout styles (e.g., as in FIG. 13 below). By contrast, conventional design methodologies have typically focused on a test chip for a single layout style known to give good matching. As the matching layout styles progress from weakest matching to strongest matching, a reduction in the variance of the measured mismatch parameters will be observed. The measured reductions in variance can be mapped onto correlation coefficients using the formula $$cc2 = 1 - \left(\frac{\sigma_R}{\sigma_A}\right)^2, \quad (2)$$

where cc2 is a correlation coefficient that corresponds to a variance reduction from a measured variance $\sigma_A$ for completely unmatched devices to a reduced measured variance $\sigma_R$ for some given layout style. That is, the correlation coefficient cc2 corresponds to a variance reduction given by the ratio $$\frac{\sigma_R}{\sigma_A}. \qquad (3)$$

When performing the geometric scaling and encoding the results in simulation models within the PDKs, different correlation coefficients are computed according to the observed reduction in variance across the different layout styles. The resulting variance reduction/correlation coefficients are calculated using the above formula and placed in the Process Design Kit along with the device models and other statistical parameters, as reflected by the Process Engineer's flowchart of FIG. 9.

Although the scaling approach described above with reference to eqs. (2)-(3) has been adequate in many operational settings for circuit design, greater accuracy in quantifying the correlation coefficients related to specific layout styles can generally be achieved by extracting characteristic data from test chips that are specifically directed to these layout styles.

Preferably, the reduction in measured variance due to the different layout styles (e.g, as shown in FIG. 13 below) is captured in the PDK's, on a per-layout-style basis based on test chip results for that layout style. In a preferred embodiment, this is done via the creation and storage of corresponding correlation coefficients for device parameters in the PDK, and correlation coefficients for valid layout styles for specific devices are then available to the design engineer as discussed below in greater detail.

Figure 11:
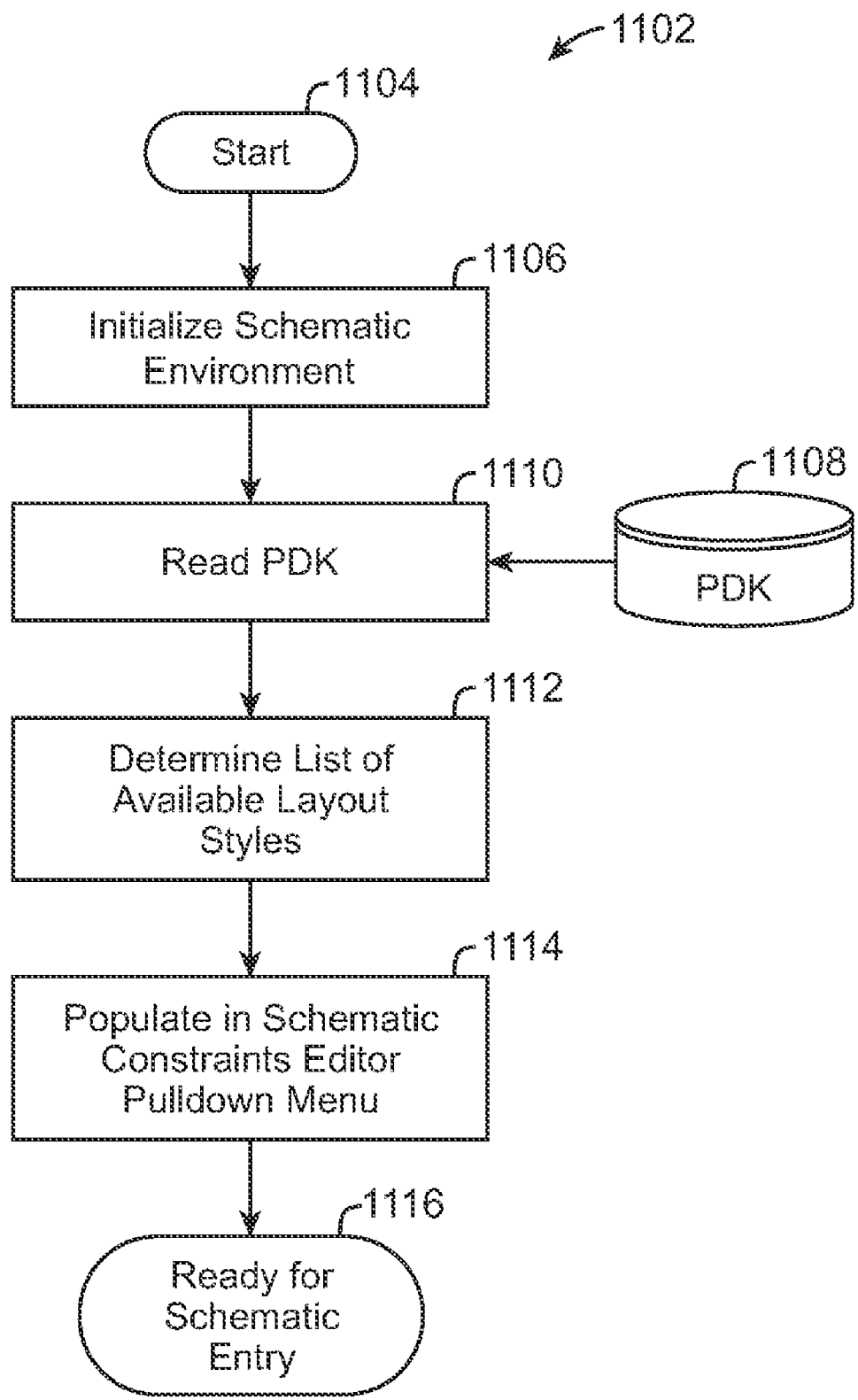
FIG. 11 shows a method of presenting layout style characteristics to a circuit designer for an embodiment of the present invention.

FIG. 11 shows further detail for layout-style operations 810 as a method 1102 of presenting layout style characteristics to the design engineer (or circuit designer). At the start 1104 of the method 1102, the schematic environment is initialized 1106. Then a PDK file 1108 is read 1110, and a list of available layout styles is determined 1112. Software for a constraints-editor pull-down menu is then populated by layout style characteristics 1114 and the design software is then ready for schematic entry and presentation to the design engineer 1116.

Once the PDK 1108 is available, it is used by the circuit designer and the circuit design software (schematic capture+ simulation tools) in the next phase. Here, the schematic capture tools read the PDK and identify the sections containing the process statistics and device models. Characteristic information (e.g., mnemonics) for the given layout styles is extracted from the PDK and made available to the Circuit Designer using special menus in the circuit design software. By doing this, the circuit designer knows what layout styles are available (and known to the simulator, which also reads the same PDK's).

Figure 12:
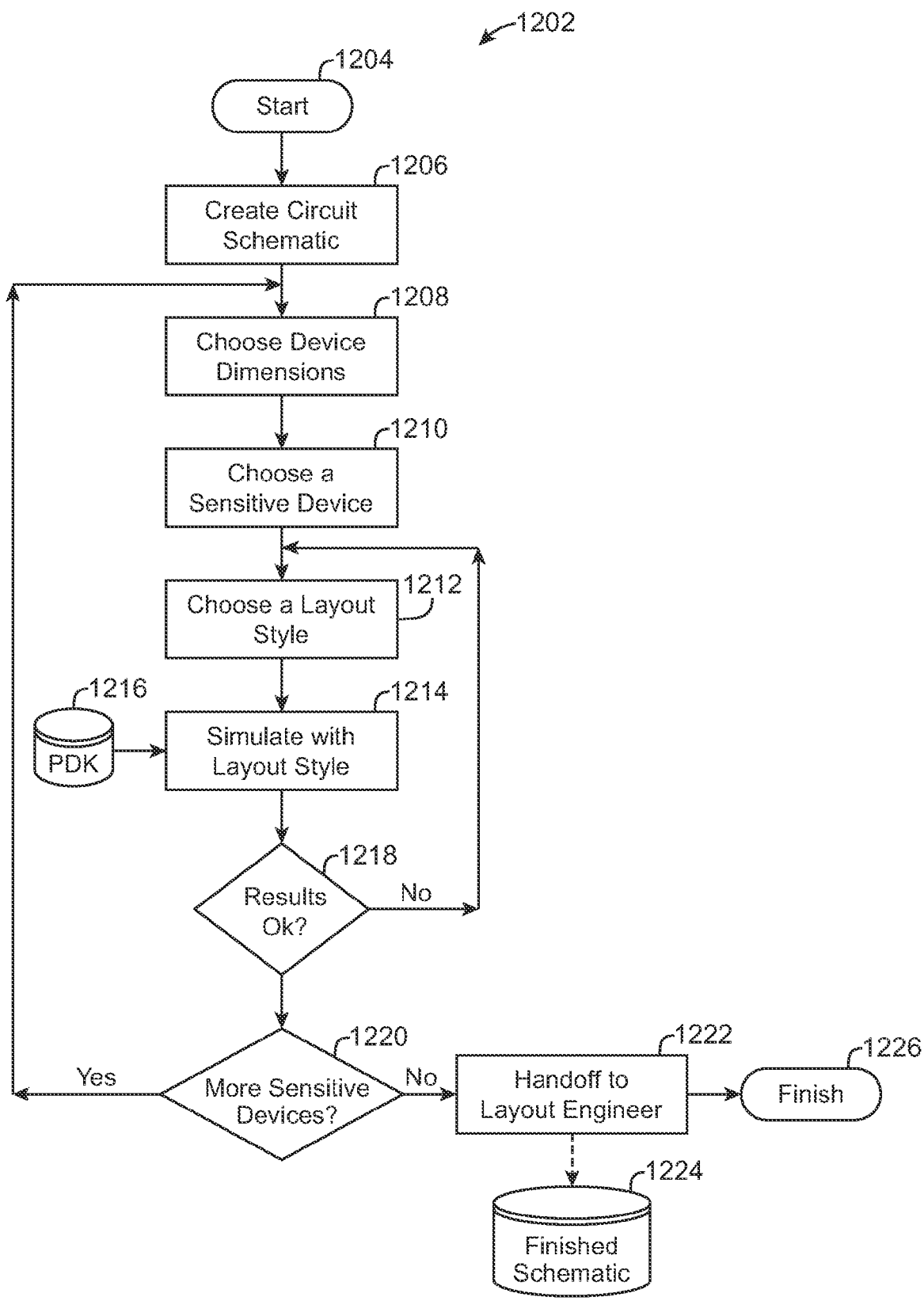
FIG. 12 shows a method of designing and simulating a layout for an embodiment of the present invention.

FIG. 12 shows further detail for design and simulation operations 812, 814 as a method 1202 of designing and simulating a layout. At the start 1204 of the method 1202, a circuit schematic is created (e.g., specified as an input) 1206. Device dimensions are chosen 1208. Then one or more devices are chosen for sensitivity analysis (e.g., a known sensitive device) 1210. A layout style is chosen for the devices being analyzed 1212, and the design is simulated 1214 (e.g., a Monte Carlo simulation) by extracting values from PDK files 1216. If the results are not adequate (e.g., with respect to performance requirements) 1218, then alternative layout styles can be chosen 1212, simulated 1214, and evaluated 1218. Additional devices can be analyzed for sensitivities to layout styles 1220, and eventually the results (e.g., a finished schematic 1224) are handed off to a layout engineer 1222 and the process terminates 1226.

As the circuit designer designs the circuit, he chooses different device types and sizes and wires them together in various desired topologies to achieve the desired circuit function. Once the basic functionality is in place, the designer then needs to verify that the design will function correctly even when manufactured on the non-ideal process in which the devices are not ideally matched. In the process of doing so, the designer needs to perform statistical simulations, identifying which particular devices need to be matched and given special layout consideration. In conventional design methods, the designer was expected to choose a numerical correlation coefficient for matched devices, in order to instruct the circuit simulator to reduce the variance for the matched devices by an appropriate amount to reflect the fact that they are matching (e.g., FIGS. 6, 7). However this detailed numerical information is typically not known to typical circuit designers. According to aspects of the this embodiment, the correlation information is now captured in the mnemonic association tables (or other layout style characteristics) within the PDK produced by the Process Engineer.

FIG. 13 shows a table relates exemplary mnemonics, which can be readily accessible to the design engineer in a menu, to the more specific qualitative details of the corresponding layout styles. These mnemonics, which are suggestively directed to the degree of matching, include "unmatched," "weakly matched," "simply matched," "moderately matched," "well matched," "very well matched," and "extremely well matched." Additional aspects of these layout styles will be discussed in more detail below.

As illustrated in FIG. 13, the circuit designer sees a series of device-specific menus offering him a choice from the various layout styles which were represented on the test chip, and which are now statistically represented within the PDK. For selected devices, the circuit designer can now simply choose a layout style, which can be indicated on the user-interface representation of the circuit design, for example, by a mnemonic or iconic characterization possibly with a corresponding bounding box to clarify which devices are being so characterized. The designer can then run the simulation, during which the circuit simulator tool also consults the same PDK and maps the mnemonic information (or equivalent) onto the detailed correlation coefficients that it then uses to internally generate the correctly correlated random numbers during a simulation (e.g., a Monte Carlo simulation that employs a conventional random number generator). As a result, the measured variance reductions for the given layout style are applied during simulation, and the circuit designer is able to observe the effects of the chosen layout style on the circuit behavior, and modify the design (and/or layout styles) accordingly.

Figure 14:
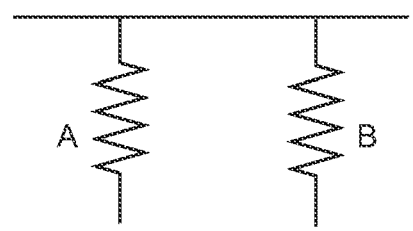
FIG. 14 shows an exemplary pair of resistors for an embodiment of the present invention.

Further characteristic details for layout styles as shown in FIG. 13 typically depend on specific properties of the devices including electrical properties (e.g., resistance) and geometrical properties (e.g., size, orientation). For example, FIG. 14 shows a pair of resistor components A, B placed by a design engineer in a schematic. When these resistors are being drawn by a layout engineer, the simplest drawn representation for them on an integrated circuit layout is as a pair of rectangles on a particular layer (such as that which represents diffusion). Since the resistance value of a resistor is directly proportional to its aspect ratio (L/W), then to match the two resistors in resistance value, all that is needed in theory is any pair of rectangles with the same aspect ratio on the same layer, such as drawn in FIG. 15 which shows two rectangles with different dimensions but the same aspect ratio.

Figure 15:
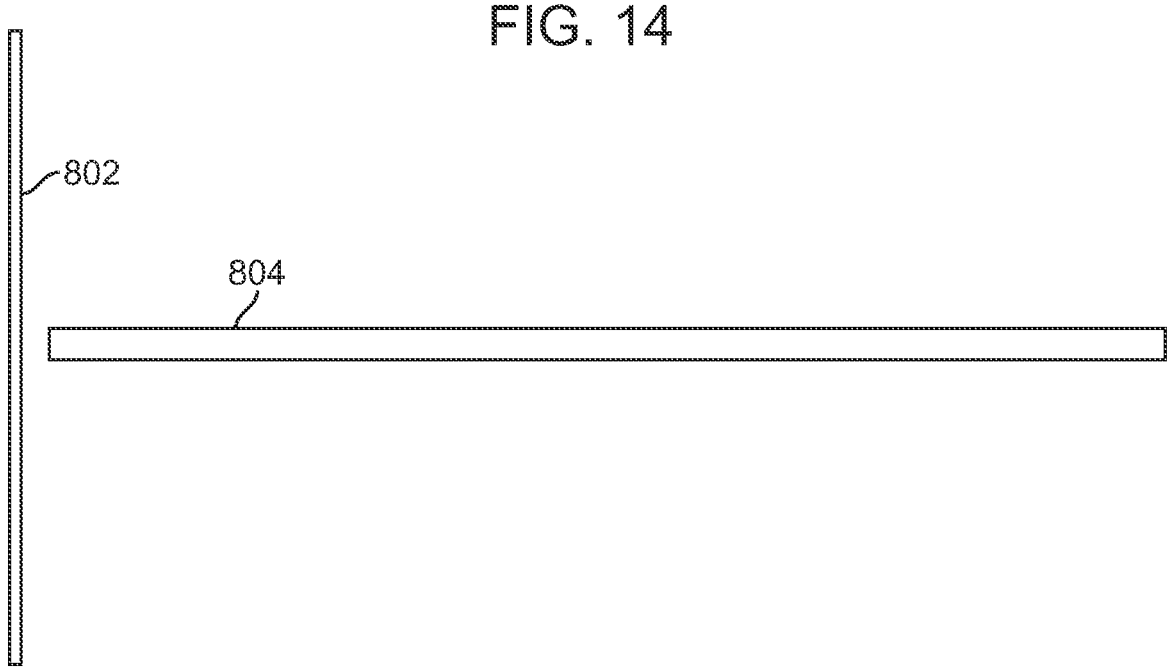
Figure 16:
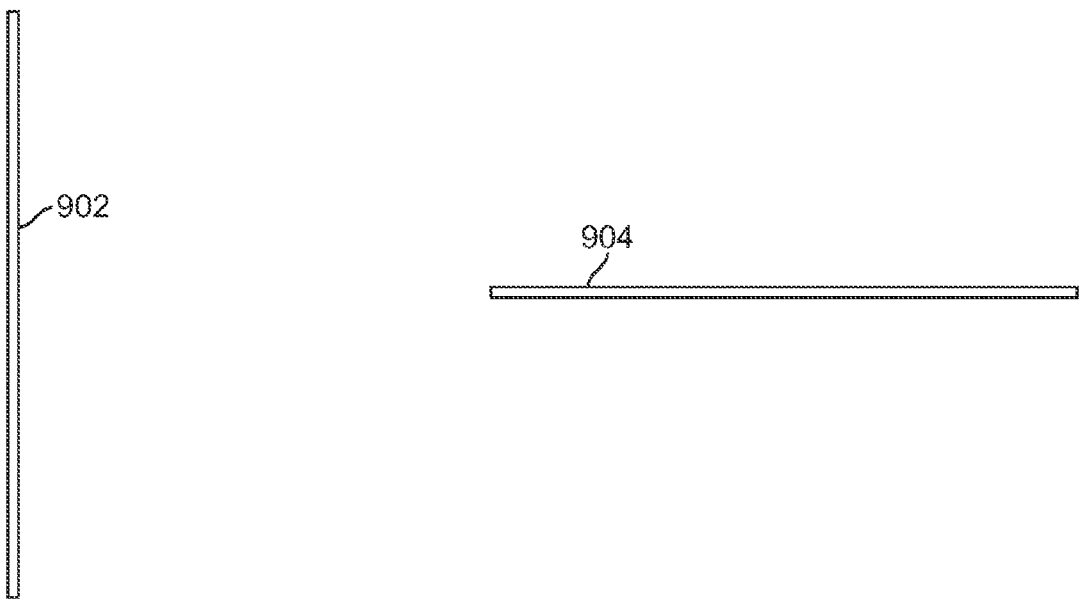
Figure 17:
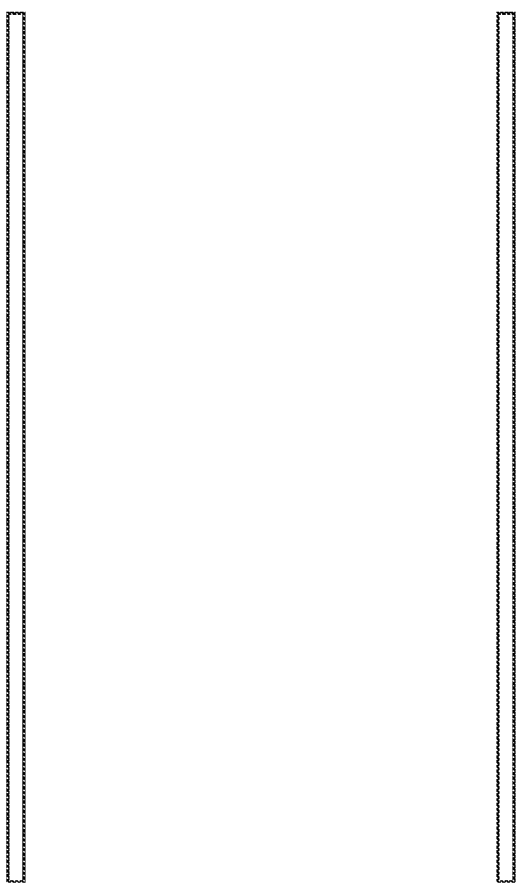

Note that while the two resistors of FIG. 15 have different areas (one is clearly bigger than the other), they both have identical aspect ratio (L/W). However, integrated circuit manufacturing processes are not perfectly controlled, hence when manufactured, any of these resistors may have its L (length) or W (width) be off by a little bit. A drawn resistor of length 1000 units may actually be manufactured with a length of 997 units, and a drawn resistor of width 30 units may actually be manufactured with a width of 32 units. As a result, in order to more closely match the two resistors in practice, they are usually drawn with the same area as shown in FIG. 16. Etching effects in manufacturing processes often tend to be directional, such that the variations in the X dimension are different from the variations in the Y dimension. In order to account for this, it would be more typical to lay out the two resistors with a similar orientation, as shown in FIG. 17. Further, improved matching is typically attained by placing devices as close to each other as possible, such as shown in FIG. 18, in order to minimize gradient effects in processing, where device properties tend to vary as a function of their absolute X/Y position on the manufacturing die in a somewhat linear fashion. That is, the closer the devices, the less delta X or delta Y between them, the closer the device properties will match.

Figure 20:
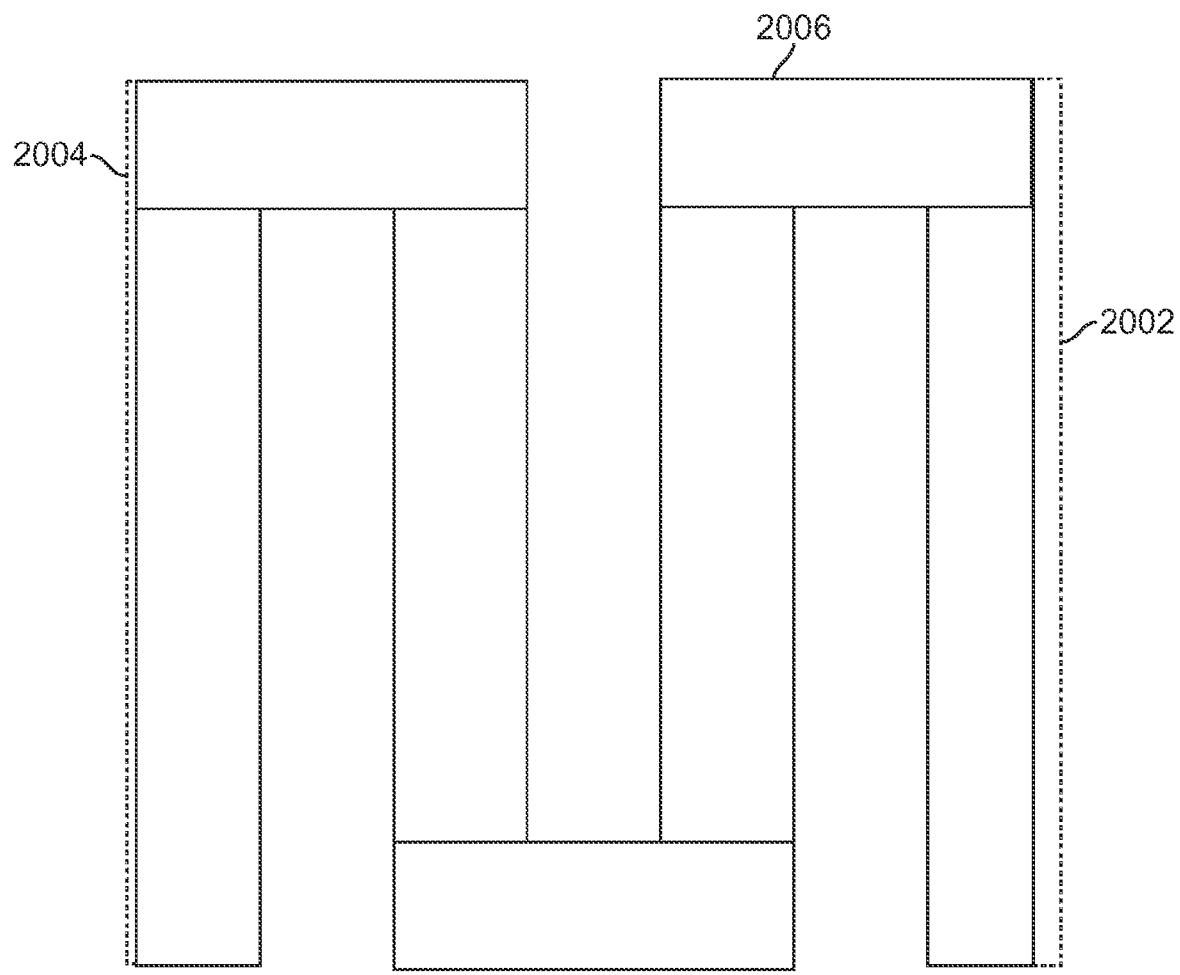
FIG. 20 shows exemplary etching effects related to the example in FIG. 19.

Additionally, a common practice is to serpentine the resistors rather than draw them as simple rectangles. FIG. 19 shows a serpentined resistor layout for the two resistors. As long as the individual segments of the serpent shape add up to the same Length (L) and Width (W) as the original simple rectangular shapes, the resistance will be equivalent. In summary, a typical layout for the pair of resistors A, B (from the schematic of FIG. 14) may be as represented in FIG. 19. However, as modern IC manufacturing processes move to smaller and smaller geometries, the amount of control over these processes is diminishing. A desired resistor serpentine layout represented by the dashed lines of FIG. 20 may actually be processed with narrower than expected segments. In FIG. 20 we see that the first and last vertical segments are over etched as indicated by the dashed lines 2002, 2004, which show the shape boundaries in the ideal case compared with the actual etched result 2006. As the processes get smaller, such edge effects tend to get larger.

Consider the pair of transistors represented by the simple serpentine layout of FIG. 19, where each resistor is subject to vertical edge effects such as shown in FIG. 20, and possibly additionally subject to horizontal edge effects in a like manner. This is in addition to other gradient affects that vary as a function of device placement X, Y on the manufacturing die. In order to achieve very good matching of the resistors, a variety of more complex layout techniques have evolved and are increasingly prevalent.

Figure 21:
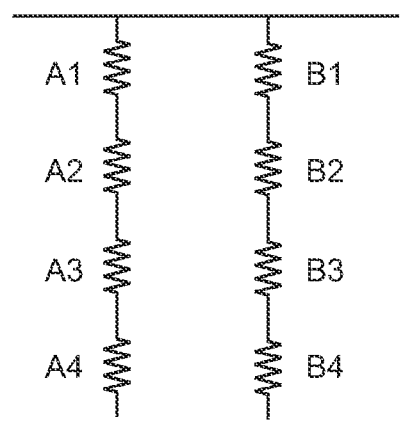
FIG. 21 shows an exemplary pair of resistors for an embodiment of the present invention.

The first such technique (apart from placing serpentined resistors as close to one another as possible, while maintaining the same orientation), is to adopt an interdigitated layout style. In order to do this, the individual devices are first split up into smaller sub-devices. For example, the pair of schematic resistors A, B in FIG. 14 may be equally represented by a set of series-connected devices A1-A4, B1-B4 as shown in FIG. 21.

Figure 22:
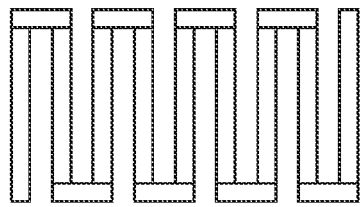
FIGS. 22, 23 & 24 show how single serpent resistor can be separated into sub-serpent resistors with bounding boxes for further analysis for an embodiment of the present invention.
Figure 23:
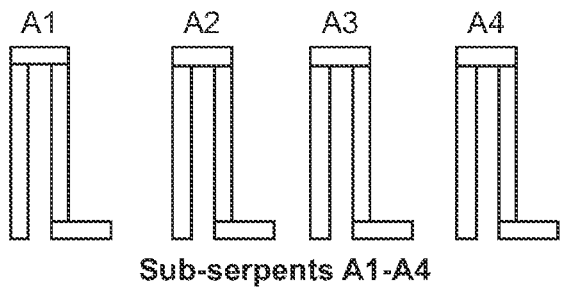

In terms of what this means for layout, a long serpent resistor such as shown in FIG. 22 may actually be split up into sub-serpents as shown in FIG. 23, which shows the long serpent of FIG. 22 as 4 sub-serpents labeled A1, A2, A3, A4. Note that each sub-serpent is associated by a bounding box.

Figure 24:
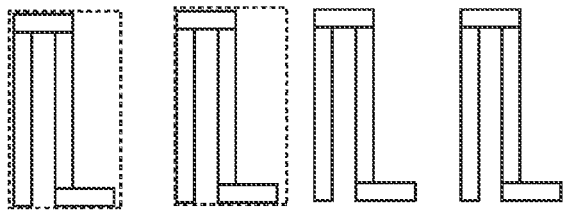
Figure 25:
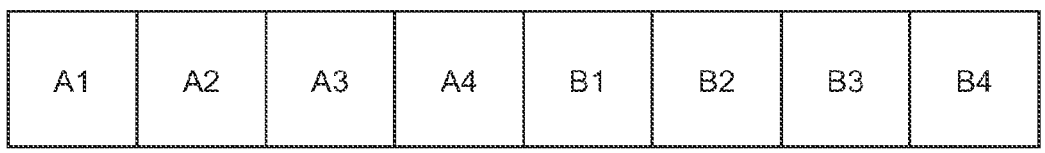

Two bounding boxes are graphically shown by the dashed outlines FIG. 24. To keep the future diagrams simple in the subsequent description, sub-serpents will be represented as via squares or rectangles that represent their bounding boxes. Note that the single serpent layout of FIG. 22 is electrically equivalent to the multi-sub-serpent layout shown in FIGS. 23 & 24 where the sub-serpents are electrically connected via regular wires The layout for the pair of serpentined resistors shown in FIG. 19 can be represented by the bounding boxes as shown in FIG. 25, where we have divided the two resistors A,B in to 4 sub-serpents (A1-A4, B1-B4), and positioned the 8 sub-serpents in a simple linear array from left to right, all horizontally aligned. In this example, the 4 segments for resistor A are placed to the left side of the array, and the 4 segments for resistor B are placed to the right side of the array.

Figure 26:
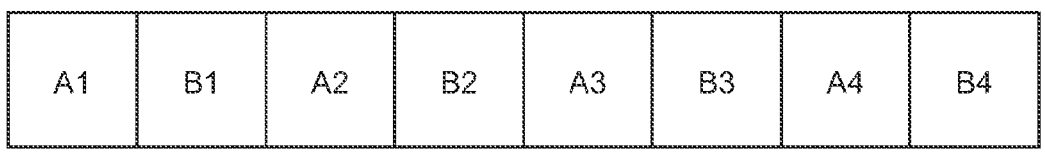

However, a technique that leads to better matching is to interdigitate the segments, as shown in FIG. 26. Often, a more elaborate scheme feeds the series from opposite ends, such as represented by the advanced resistor interdigitation scheme of FIG. 27. Consider for a moment the resistor segment A2 in FIG. 27. It is surrounded to both its left and its right by similar resistor segments B4 and B3. However, resistor segment A1 only has a right neighbor (B4). Because of this lack of a left neighbor, it is often the case in the manufacturing process that the etch effects on the left edges of the serpent for segment A1 are significantly different from those on the corresponding left edges of the serpents B4, (or A2, or B3, etc.). A similar statement may be made with regard to the right edge of segment B1, though the degree will likely differ due to differences in etching directions (from right to left, versus from left to right). These non-symmetrical effects are shown in FIG. 20 in which the deviation from ideal on the left side is smaller than the deviation on the right side (i.e., by comparing actual edges against the dashed lines indicating the desired edges). In order to account for these effects, yet a more advanced matching layout technique is as shown in FIG. 28.

In FIG. 28, dummy devices B (identical resistor serpents) are placed at either end of the linear array, but are not electrically connected. Hence, resistor segment A1 is now surrounded to both its left and right sides by similar serpent shapes (D, B4 respectively). The presence of electrically insignificant segment D to the left of A1 tends to reduce the etch effect on A1. D itself is instead "sacrificially" subjected to the etch effect, but that is inconsequential since D is electrically unconnected. A similar statement can be made to the right dummy neighbor placed to the right of B1. Because of the placement of the two dummy devices, the etch effects for A1 and B1 are similar to the etch effects for B4 and A4. The net effect is that in FIG. 28 the composite resistor A is more closely matched to the composite resistor B.

In order to account for manufacturing process variations which tend to vary in a diagonal manner across the chip surface, a further layout style employed for components which must tightly match is to lay them out in a "cross quad" manner, such as indicated in FIG. 29 in which the device segments are laid out in a more two dimensional manner.

To be even tighter matched, symmetry is exploited using the style shown in FIG. 30, where the axes of symmetry are indicated by the dashed lines. This style tends to further reduce (average out) mismatch effects that are related to absolute device X,Y positions on the die.

Finally, whereas FIG. 20 shows some etching effects on the vertical (leftmost and rightmost) edges of the resistor serpent, note that similar effects can also take place on the horizontal (topmost and bottommost) edges. In order to compensate for these effects, it is possible to surround the entire array of device segments with dummy devices, as shown by the layout style of FIG. 31. Only the devices in the "core" of the array are electrically significant. The layout of FIG. 31 tends to give a very good matching, though at the cost of increased area (cost) and extra routing complexity.

FIG. 32 shows an expanded version of FIG. 13 that shows, in addition to mnemonic labels and qualitative details, corresponding figures that illustrate the geometric characteristics and constraints associated with the different layout styles. As discussed above, the more precise quantitative characteristics of each layout style will be reflected in the details of the test chips used by the process engineer 902.

Figure 33:
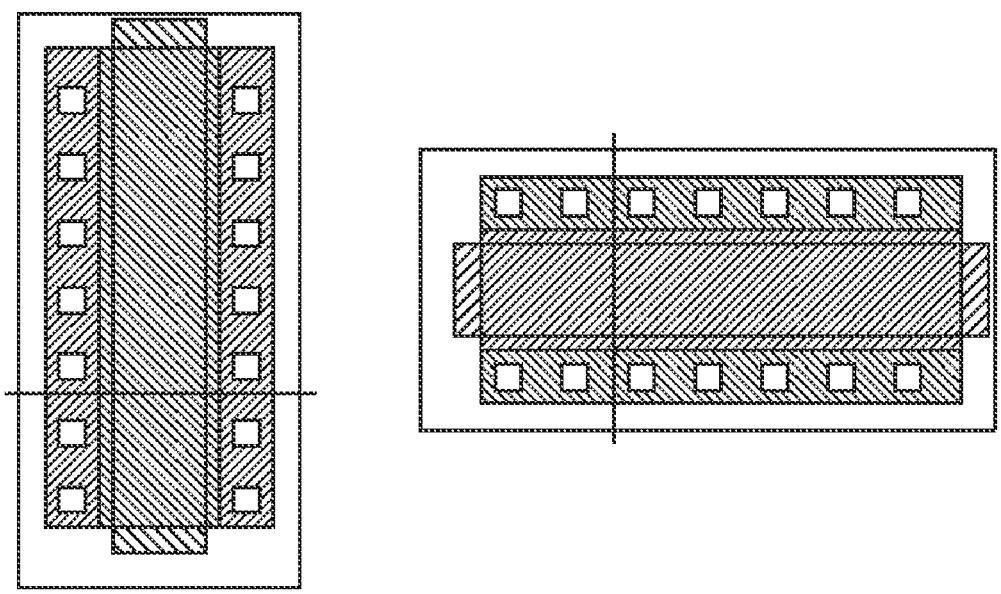
FIG. 33 shows an exemplary layout for a pair of MOS transistors representing a poorly laid out differential pair for an embodiment of the present invention.
Figure 34:
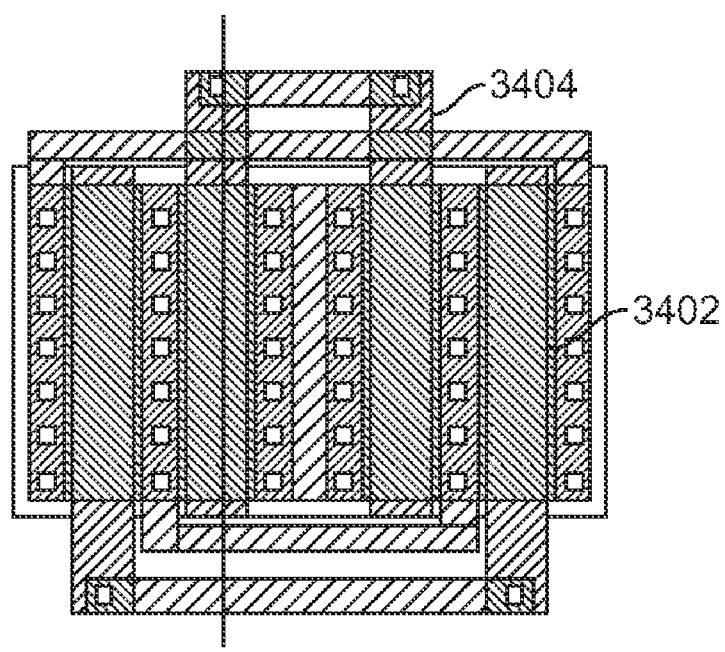
FIG. 34 shows a modification of the example in FIG. 33 where the transistors laid out in a common-centroid geometry for improved matching.

While the above discussion holds true for Resistor components, the general techniques are equally applicable to other types of IC devices such as MOSFETs and Bipolar Transistors. FIG. 33 shows an exemplary layout for a pair of MOS transistors representing a poorly laid out differential pair. While similar in many aspects, we can see that these devices are not matched due to their different orientations. On the other hand, FIG. 34 shows the same transistors laid out in a common-centroid geometry. In an manner analogous to the resistor sub-serpents considered in the previous discussion, this MOS differential pair is split into two 2-fingered devices 3402, 3404, laid out in an ABBA manner to exploit the improved matching characteristics of a common-centroid symmetrical approach. Similarly, as in the case of well-matched resistors, this comes with a cost of increased area and routing complexity.

Conventional software tools can be modified to include features of the embodiments described above. FIG. 35 shows a statistics block written by modeling/process expert (e.g., as in the process engineer workflow 902) where these features are incorporated in a data structure denoted correlate_group. At the top of the statistics block, the statistical variation of process and mismatch parameters is specified with gaussian distributions. In the correlate_group data structure, layout styles are given for two "master" transistors. For transistor master (i.e., type) "npn1" the layout styles are denoted as "interdigitated," "strong," and "weak," and for transistor master "pnp99" the layout styles are likewise denoted as "interdigitated," "strong," and "weak" (although differently named styles could also be used). These layout styles include fields for iconic characterizations, which can be used to populate a menu of the user interface as illustrate in FIG. 36, which shows and example of a user menu for "interdigitated," which might appear after the user has selected corresponding devices in the circuit diagram.

The above syntax for correlate_groups allows the simulator to access and utilize what any arbitrary matching type such as "interdigitated" means for different types of device masters and exactly what the corresponding correlation coefficients are for the different parameters. This syntax captures individual correlation coefficients which reduce variance according to sqrt (1−cc) (i.e., $\sqrt{1-cc}$) for the given named parameters, for the given named layout style, and for the given name device type (master).

For example, for the "npn1" device type, a layout style denoted "weak" (which may simply be two transistors placed in close proximity) implies that the parameters p1, p2 and p3 will have a correlation coefficient of 0.87 which exhibits a reduction in variance of sqrt(1−0.87) or sqrt(0.13) or 0.36 or 1/2.77 (i.e., 2.77 times reduction in variance for these parameters p1, p2, p3 compared to completely unmatched devices, e.g., those placed far apart with no attempts made to improve their matching). However, for parameters p4, p5, p6, the reduction in variance is sqrt(1−0.81) or 0.435 or 1/2.29 (i.e., a slightly less reduction in variance of 2.29 compared the corresponding parameters of completely unmatched transistors).

For a matching style of "interdigitated" for that same device type "npn1", we see higher correlation coefficients for these same two groups of parameters, with corresponding reductions in variance of sqrt(1−0.98) and sqrt(1−0.97) respectively or improvements of 7.07 and 5.77.

With correlation coefficients for different device types, parameters and layout styles grouped in a manner such as the above and placed in a PDK by a process/modeling engineer, the design engineer can now work at a higher level of abstraction. The GUI (Graphical User Interface) shown in FIG. 36 is desirably intuitive (e.g., as compared with convention GUI options as in FIGS. 6 & 7). A designer now simply selects a layout style from a list of predefined layout styles specified by some characteristic such as an icon or mnemonic. The list of styles can be obtained by the environment by parsing the correlate_group statements in the PDK statistics block and looking for the "matching=" clauses for each device type (e.g., as in FIG. 35). When the circuit designer selects some devices of the same type in the schematic editor, then based on the master definition for those selected devices, the appropriate list of layout styles is dynamically populated into a browser as shown in FIG. 36.

FIG. 37 shows an exemplary netlist that may result from this process, where values may be entered through a GUI or conventional text editing. Notably, the circuit designer is free to specify individual correlation coefficients as desired, or can use aspects of the above embodiments to specify which device layout styles are represented by the more intuitive string values such as "interdigitated", "strong" or "weak". For example, for the device pair [q1,q2] is specified as type npn1 in the first two lines, so that this information is available to the simulator. In the statistics block below, these devices are matched according to layout style "interdigitated," which can be properly interpreted by the simulator for the corresponding device type. That is, based on the matching="interdigitated" clause in the correlate statement for that device instance, the simulator looks up its internal data structures to see if there is a correlation group defined for a master/model "npn1", which it successfully finds. The simulator now knows exactly what parameters are to be correlated with what correlation coefficients, and can generate the random numbers appropriately.

In addition, the device pair [q88,q99] is specified as type "npn1" in the third and fourth lines. However, in this case the correlation coefficients are specified directly as indicated in the statistics block. When mismatch statistics/random numbers are being generated by the simulator for device pair [q88, q99], parameters [p1 p2 p3] will be generated according to a correlation coefficient of 0.95, and parameters [p3 p4 p5] will be generated according to a correlation coefficient of 0.92 as specified.

As understood by those skilled in the art of circuit design, different syntaxes can be employed for representing the layout style information including different keywords, statement orderings, enclosure schemes (e.g., curly braces), etc., so long as the semantics enables the specification of different correlation coefficients for parameters and groups of parameters for different device types analogously to the syntax for correlate_groups in FIG. 35. For example, FIG. 38 shows another correlate_group structure organized primarily by layout matching style and secondarily by device masters. For example, matching style "interdigitated" includes entries for device masters "npn1" and "pnp99," and matching style "strong" includes entries for device masters "npn1" and "pnp99." Additional variations are also possible as in, for example, separating the entries for matching styles "interdigitated" and "strong" into separate data structures (e.g., separate correlate_group blocks).

At least some values for the results of the above-described methods can be output to a user or saved for subsequent use. For example, selected layout styles, PDK files and netlist files can be saved directly for application as in circuit design. Alternatively, some derivative or summary form of the results (e.g., averages, performance values, etc.) can be saved for later use according to the requirements of the operational setting.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Figure 39:
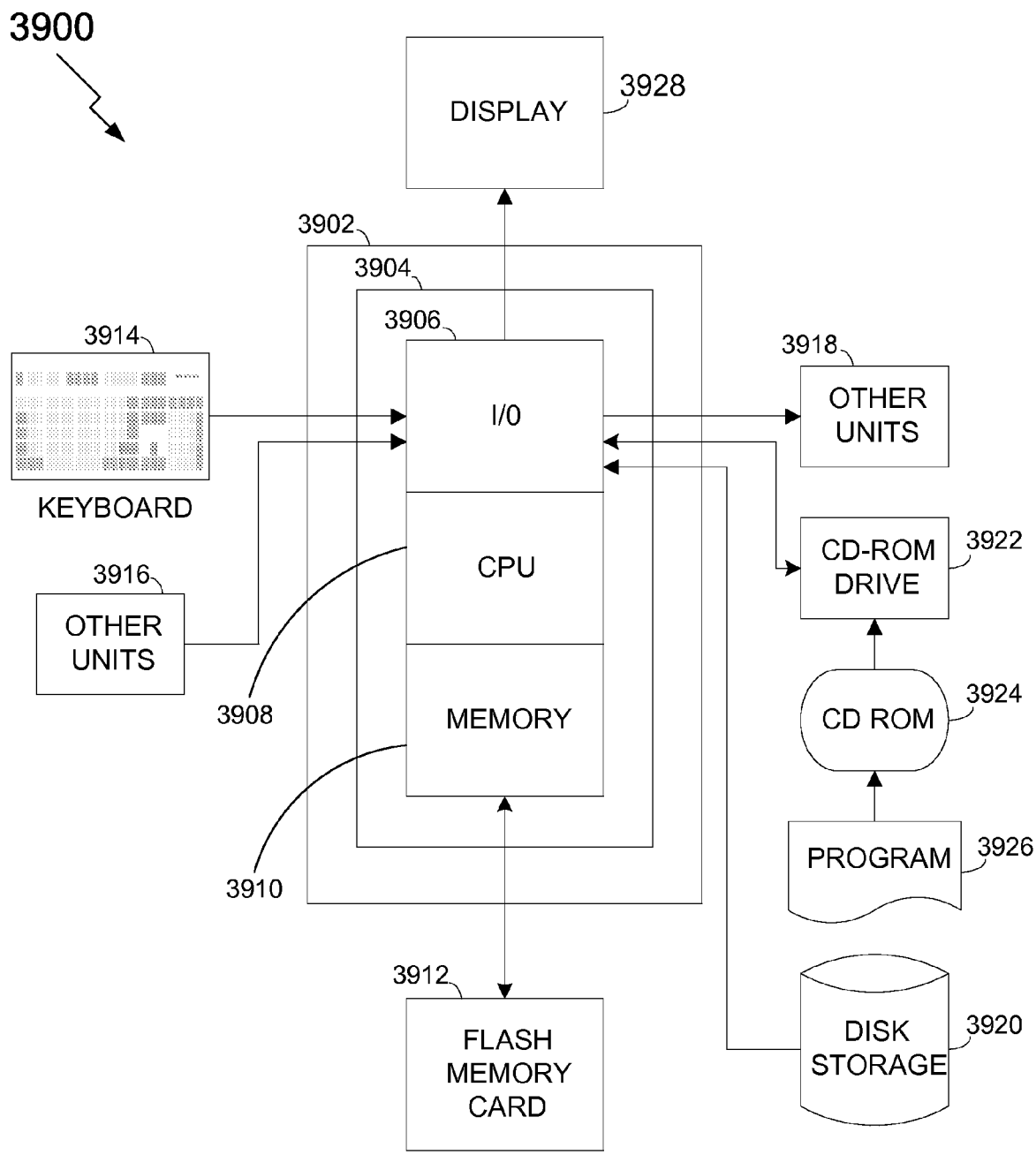
FIG. 39 shows a conventional general-purpose computer.

As described above, certain embodiments of the present invention can be implemented using standard computers and networks including the Internet. FIG. 39 shows a conventional general purpose computer 3900 with a number of standard components. The main system 3902 includes a motherboard 3904 having an input/output (I/O) section 3906, one or more central processing units (CPU) 3908, and a memory section 3910, which may have a flash memory card 3912 related to it. The I/O section 3906 is connected to a display 3928, a keyboard 3914, other similar general-purpose computer units 3916, 3918, a disk storage unit 3920 and a CD-ROM drive unit 3922. The CD-ROM drive unit 3922 can read a CD-ROM medium 3924 which typically contains programs 3926 and other data.

Figure 40:
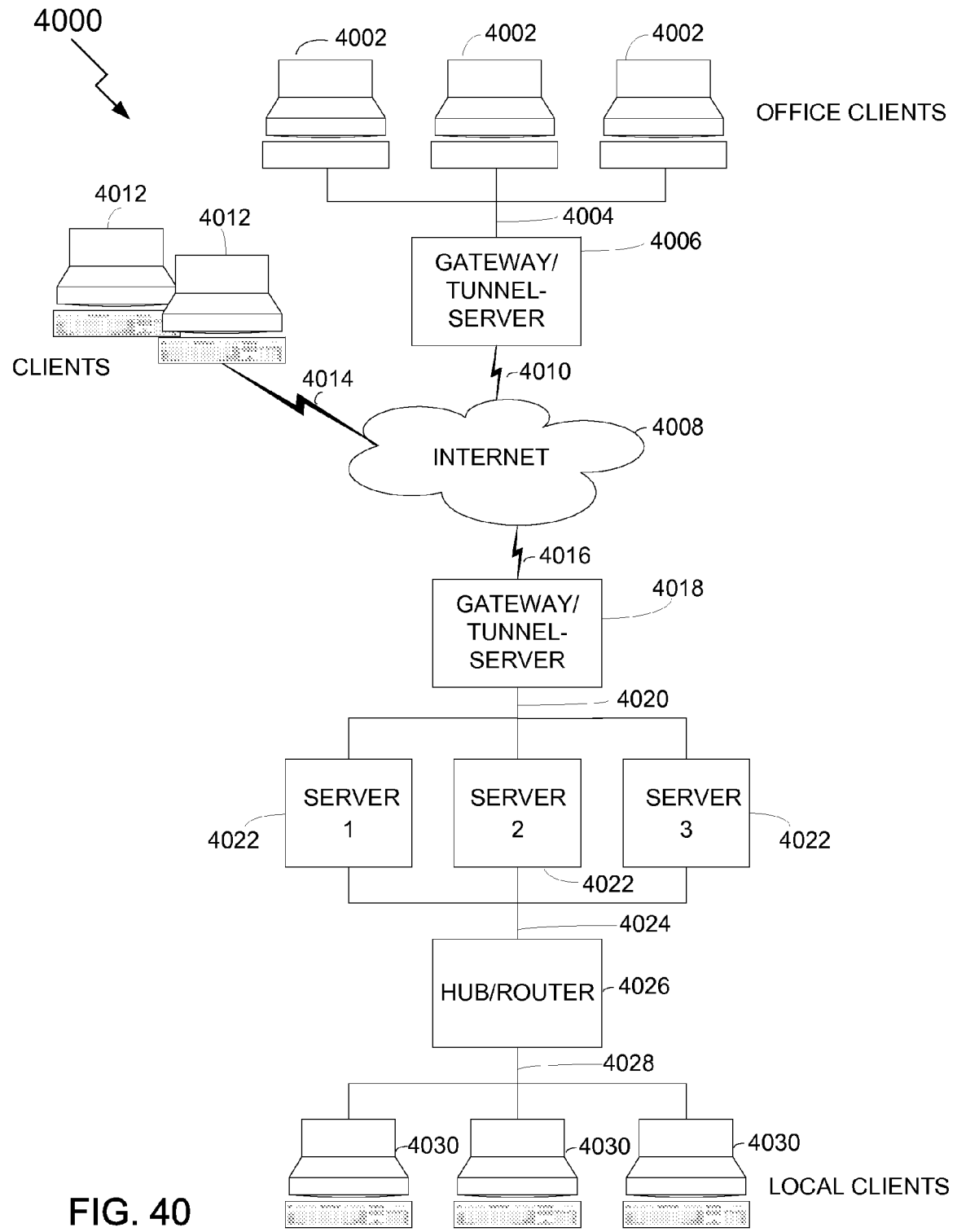
FIG. 40 shows a conventional Internet network configuration.

FIG. 40 shows a conventional Internet network configuration 4000, where a number of office client machines 4002, possibly in a branch office of an enterprise, are shown connected 4004 to a gateway/tunnel-server 4006 which is itself connected to the Internet 4008 via some internet service provider (ISP) connection 4010. Also shown are other possible clients 4012 similarly connected to the Internet 4008 via an ISP connection 4014. An additional client configuration is shown for local clients 4030 (e.g., in a home office). An ISP connection 4016 connects the Internet 4008 to a gateway/tunnel-server 4018 that is connected 4020 to various enterprise application servers 4022. These servers 4022 are connected 4024 to a hub/router 4026 that is connected 4028 to various local clients 4030.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of designing a circuit, comprising:
specifying a plurality of layout styles for devices, wherein each layout style includes values that specify geometrical constraints for arranging devices and one or more correlation coefficients for statistical simulation parameters that characterize device-matching corresponding to the geometrical constraints;
specifying a schematic for the circuit, wherein the schematic includes devices, connections between devices, and electrical parameters that specify electrical properties of the devices;
determining a layout for the circuit from the schematic by specifying sizes of the devices and an arrangement of the devices, wherein determining the layout includes using a computer to select layout styles for one or more devices in the circuit schematic; and
evaluating one or more performance metrics for the layout by using the computer to simulate circuit performance with device models that are statistically correlated according to the specified layout styles.

2. A method according to claim 1, further comprising:
identifying a pair of devices for stronger matching in the design of the integrated circuit; and
selecting a first layout style for the pair of devices, the first layout style having a larger correlation coefficient relative to a reference correlation coefficient for the pair of devices.

3. A method according to claim 1, wherein the layout styles include a plurality of layout styles for different degrees of matching for simulation parameters of at least some devices, a weaker matching corresponding to a smaller correlation coefficient and a stronger matching corresponding to a larger correlation coefficient.

4. A method according to claim 1, wherein selecting layout styles includes selecting a choice item in a graphical user interface of the computer, wherein the graphical user interface presents choices for layout styles that correspond to selected devices in the circuit schematic including a plurality of choices for different degrees of matching for at least some devices, a weaker matching corresponding to a smaller correlation coefficient and a stronger matching corresponding to a larger correlation coefficient.

5. A method according to claim 1, wherein simulating circuit performance includes:
determining a plurality of simulated layouts by selecting correlated values for simulation parameters according to the specifications of the corresponding layout styles; and
evaluating the one or more performance metrics for the simulated layouts to identify at least one pair of devices for stronger matching in the design of the integrated circuit.

6. A method according to claim 1, wherein the layout is a first layout and the method further comprises:
determining a second layout for the circuit by changing layout styles for at least two devices to improve at least one of the one or more performance metrics by changing a degree of matching for the at least two devices; and evaluating the one or more performance metrics for the second layout by using the computer for simulating circuit performance with device models that are correlated according to the specified layout styles.

7. A method according to claim 1, wherein
selecting the layout styles for one or more devices in the schematic includes selecting corresponding choice items in a graphical user interface of the computer, and
simulating circuit performance includes determining a plurality of simulated layouts by selecting correlated values for simulation parameters according to the specifications of the corresponding layout styles, and evaluating the one or more performance metrics for the simulated layouts.

8. A method according to claim 1, further comprising:
providing test chips for the layout styles, wherein each test chip includes a plurality of devices that are arranged with geometrical constraints according to a corresponding layout style;
measuring characteristic values for mismatch variations of the devices on the test chips;
determining correlation coefficients for the layout styles from the characteristic values; and
associating choice items for a graphical user interface of the computer with the layout styles, wherein
selecting the layout styles for one or more devices in the schematic includes selecting corresponding choice items in the graphical user interface of the computer, and simulating circuit performance includes determining a plurality of simulated layouts by selecting correlated values for simulation parameters according to the correlation coefficients of the corresponding layout styles, and evaluating the one or more performance metrics for the simulated layouts.

9. A computer-readable medium that stores a computer program for designing a circuit, wherein the computer program includes instructions for:
specifying a plurality of layout styles for devices, wherein each layout style includes values that specify geometrical constraints for arranging devices and one or more correlation coefficients for statistical simulation parameters that characterize device-matching corresponding to the geometrical constraints;
specifying a schematic for the circuit, wherein the schematic includes devices, connections between devices, and electrical parameters that specify electrical properties of the devices;
determining a layout for the circuit from the schematic by specifying sizes of the devices and an arrangement of the devices, wherein determining the layout includes selecting layout styles for one or more devices in the circuit schematic; and
evaluating one or more performance metrics for the layout by simulating circuit performance with device models that are statistically correlated according to the specified layout styles.

10. A computer-readable medium according to claim 9, wherein the computer program further includes instructions for:
identifying a pair of devices for stronger matching in the design of the integrated circuit; and
selecting a first layout style for the pair of devices, the first layout style having a larger correlation coefficient relative to a reference correlation coefficient for the pair of devices.

11. A computer-readable medium according to claim 9, wherein the layout styles include a plurality of layout styles for different degrees of matching for simulation parameters of at least some devices, a weaker matching corresponding to a smaller correlation coefficient and a stronger matching corresponding to a larger correlation coefficient.

12. A computer-readable medium according to claim 9, wherein selecting layout styles includes selecting a choice item in a graphical user interface of the computer, wherein the graphical user interface presents choices for layout styles that correspond to selected devices in the circuit schematic including a plurality of choices for different degrees of matching for at least some devices, a weaker matching corresponding to a smaller correlation coefficient and a stronger matching corresponding to a larger correlation coefficient.

13. A computer-readable medium according to claim 9, wherein simulating circuit performance includes:
determining a plurality of simulated layouts by selecting correlated values for simulation parameters according to the specifications of the corresponding layout styles; and
evaluating the one or more performance metrics for the simulated layouts to identify at least one pair of devices for stronger matching in the design of the integrated circuit.

14. A computer-readable medium according to claim 9, wherein the layout is a first layout and the computer program further includes instructions for:
determining a second layout for the circuit by changing layout styles for at least two devices to improve at least one of the one or more performance metrics by changing a degree of matching for the at least two devices; and
evaluating the one or more performance metrics for the second layout by using the computer for simulating circuit performance with device models that are correlated according to the specified layout styles.

15. A computer-readable medium according to claim 9, wherein
selecting the layout styles for one or more devices in the schematic includes selecting corresponding choice items in a graphical user interface of the computer, and
simulating circuit performance includes determining a plurality of simulated layouts by selecting correlated values for simulation parameters according to the specifications of the corresponding layout styles, and evaluating the one or more performance metrics for the simulated layouts.

16. A computer-readable medium according to claim 9, wherein the computer program further includes instructions for:
receiving characteristic values for mismatch variations of the devices, wherein the characteristic values correspond to measurements from test chips for the layout styles, wherein each test chip includes a plurality of devices that are arranged with geometrical constraints according to a corresponding layout style;
determining correlation coefficients for the layout styles from the characteristic values; and
associating choice items for a graphical user interface of the computer with the layout styles, wherein
selecting the layout styles for one or more devices in the schematic includes selecting corresponding choice items in the graphical user interface of the computer, and simulating circuit performance includes determining a plurality of simulated layouts by selecting correlated values for simulation parameters according to the correlation coefficients of the corresponding layout styles, and evaluating the one or more performance metrics for the simulated layouts.

17. An apparatus for designing a circuit, the apparatus comprising a computer for executing computer instructions, wherein the computer includes computer instructions for:

specifying a plurality of layout styles for devices, wherein each layout style includes values that specify geometrical constraints for arranging devices and one or more correlation coefficients for statistical simulation parameters that characterize device-matching corresponding to the geometrical constraints;

specifying a schematic for the circuit, wherein the schematic includes devices, connections between devices, and electrical parameters that specify electrical properties of the devices;

determining a layout for the circuit from the schematic by specifying sizes of the devices and an arrangement of the devices, wherein determining the layout includes selecting layout styles for one or more devices in the circuit schematic; and evaluating one or more performance metrics for the layout by simulating circuit performance with device models that are statistically correlated according to the specified layout styles.

18. An apparatus according to claim 17, wherein the computer further includes computer instructions for:

identifying a pair of devices for stronger matching in the design of the integrated circuit; and selecting a first layout style for the pair of devices, the first layout style having a larger correlation coefficient relative to a reference correlation coefficient for the pair of devices.

19. An apparatus according to claim 17, wherein the layout styles include a plurality of layout styles for different degrees of matching for simulation parameters of at least some devices, a weaker matching corresponding to a smaller correlation coefficient and a stronger matching corresponding to a larger correlation coefficient.

20. An apparatus according to claim 17, wherein selecting layout styles includes selecting a choice item in a graphical user interface of the computer, wherein the graphical user interface presents choices for layout styles that correspond to selected devices in the circuit schematic including a plurality of choices for different degrees of matching for at least some devices, a weaker matching corresponding to a smaller correlation coefficient and a stronger matching corresponding to a larger correlation coefficient.

21. An apparatus according to claim 17, wherein simulating circuit performance includes:

determining a plurality of simulated layouts by selecting correlated values for simulation parameters according to the specifications of the corresponding layout styles; and evaluating the one or more performance metrics for the simulated layouts to identify at least one pair of devices for stronger matching in the design of the integrated circuit.

22. An apparatus according to claim 17, wherein the layout is a first layout and the computer further includes computer instructions for:

determining a second layout for the circuit by changing layout styles for at least two devices to improve at least one of the one or more performance metrics by changing a degree of matching for the at least two devices; and evaluating the one or more performance metrics for the second layout by using the computer for simulating circuit performance with device models that are correlated according to the specified layout styles.

23. An apparatus according to claim 17, wherein selecting the layout styles for one or more devices in the schematic includes selecting corresponding choice items in a graphical user interface of the computer, and simulating circuit performance includes determining a plurality of simulated layouts by selecting correlated values for simulation parameters according to the specifications of the corresponding layout styles, and evaluating the one or more performance metrics for the simulated layouts.

24. An apparatus according to claim 17, wherein the computer further includes computer instructions for:

receiving characteristic values for mismatch variations of the devices, wherein the characteristic values correspond to measurements from test chips for the layout styles, wherein each test chip includes a plurality of devices that are arranged with geometrical constraints according to a corresponding layout style;

determining correlation coefficients for the layout styles from the characteristic values; and associating choice items for a graphical user interface of the computer with the layout styles, wherein selecting the layout styles for one or more devices in the schematic includes selecting corresponding choice items in the graphical user interface of the computer, and simulating circuit performance includes determining a plurality of simulated layouts by selecting correlated values for simulation parameters according to the correlation coefficients of the corresponding layout styles, and evaluating the one or more performance metrics for the simulated layouts.

25. An apparatus according to claim 17, wherein the computer includes a processor with memory for executing at least some of the computer instructions.

26. An apparatus according to claim 17, wherein the computer includes circuitry for executing at least some of the computer instructions.

* * * * *

UNITED STATES PATENT AND TRADEMARK OFFICE
CERTIFICATE OF CORRECTION

| | | |
|---|---|---|
| PATENT NO. | : 8,176,463 B2 | Page 1 of 1 |
| APPLICATION NO. | : 12/561801 | |
| DATED | : May 8, 2012 | |
| INVENTOR(S) | : Donald J. O'Riordan et al. | |

It is certified that error appears in the above-identified patent and that said Letters Patent is hereby corrected as shown below:

On Sheet 4 of 22, Reference Numeral 820, Figure 8, line 2, delete "Manufatured" and insert -- Manufactured --, therefor.

On Sheet 9 of 22, Figure 13, line 1, delete "Mmenomic" and insert -- Mnemonic --, therefor.

On Sheet 9 of 22, Figure 13, line 8, delete "Interdigited," and insert -- Interdigitated, --, therefor.

On Sheet 16 of 22, Figure 32, line 1, delete "Mmenomic" and insert -- Mnemonic --, therefor.

On Sheet 16 of 22, Figure 32, line 8, delete "Interdigited," and insert -- Interdigitated, --, therefor.

On Sheet 19 of 22, Figure 36, line 7, delete "interdigated" and insert -- interdigitated --, therefor.

In column 4, line 26, delete "(XRSP-1)))." and insert -- (XRSP-1)). --, therefor.

In column 6, line 16, delete "the a" and insert -- a --, therefor.

In column 7, line 25, delete "e.g," and insert -- e.g., --, therefor.

In column 8, line 21, delete "the this" and insert -- this --, therefor.

In column 10, line 8, delete "wires" and insert -- wires. --, therefor.

In column 11, line 22, delete "an" and insert -- a --, therefor.

Signed and Sealed this
Seventeenth Day of July, 2012

David J. Kappos
*Director of the United States Patent and Trademark Office*